Jan. 31, 1950 P. HEFTLER 2,495,719
BRAKE AND SPRING SUSPENSION LINKAGE
Filed May 31, 1944

INVENTOR
Paul Heftler

UNITED STATES PATENT OFFICE 2,495,719

BRAKE AND SPRING SUSPENSION LINKAGE

Paul Heftler, Grosse Pointe Park, Mich.

Application May 31, 1944, Serial No. 538,131
In Great Britain October 20, 1938

5 Claims. (Cl. 188—2)

This invention is a spring suspension and brake linkage for the front wheels of automobiles designed so that there will be no nose-diving when the brakes are applied. Suspensions so designed have already been invented and built, but they have the disadvantage that the king pin, as seen from the side, changes its angle to the vertical as the wheel rises and falls. This may or may not be a real fault in those suspensions, but it is one to which many automobile engineers object, and hence it is a disadvantage. The present invention is a suspension combined with a brake linkage in such a way that, although the angle of the king pin does not change as the wheel rises and falls, the brake backing or anchor plate turns a little, and the amount that it turns is enough to satisfy the conditions which have been discovered to prevent nose-diving.

Figure 1:
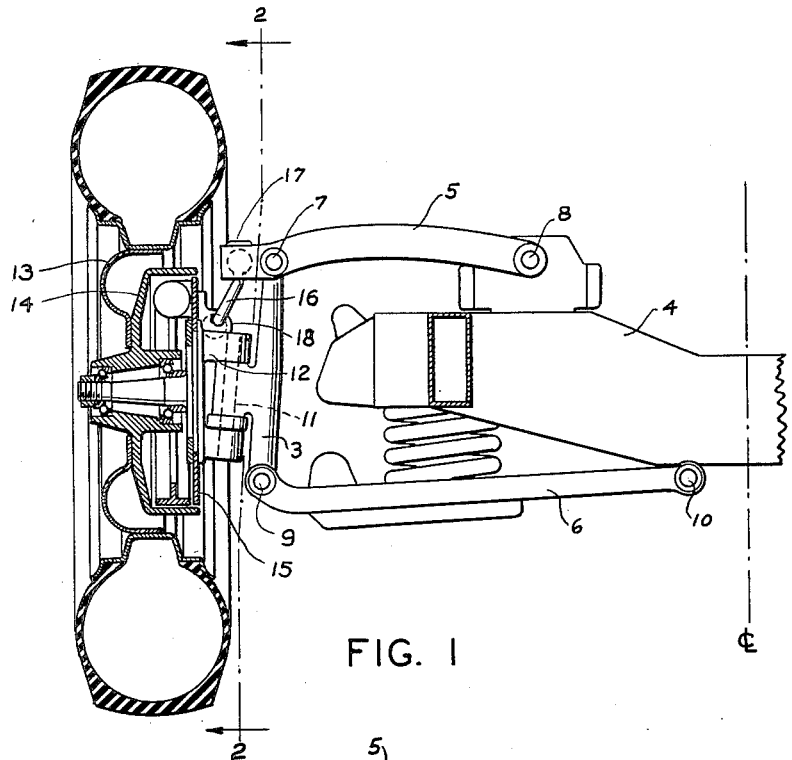
Figure 1 is a rear view that is partly in section and that shows one form of the invention applied to the left front wheel of an automobile.
Figure 2:
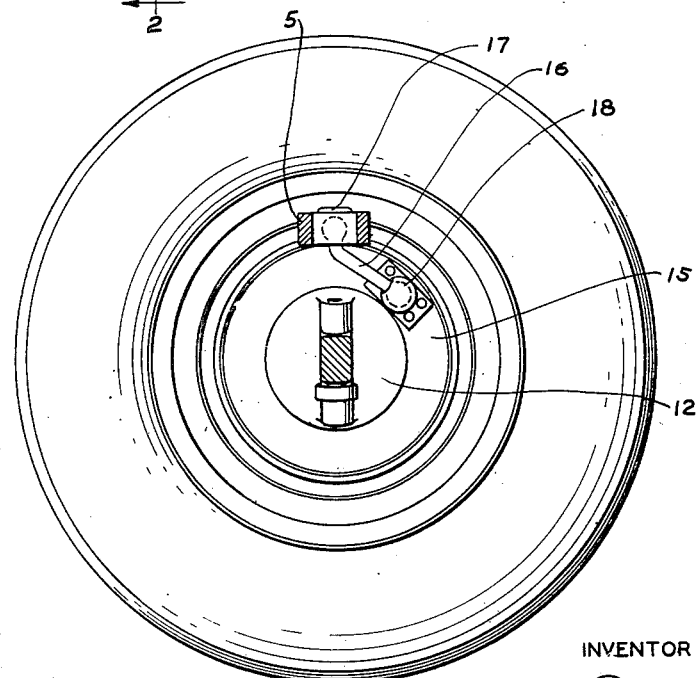
Figure 2 is a section on the line 2—2 in Figure 1.

The form of the invention shown in the drawing is a standard double wishbone type of suspension with a few additional features. It includes a steering knuckle support 3 connected to the frame 4 of the car by upper and lower wishbones 5 and 6. The axes of the pivots 7 and 8 between the upper wishbone and the steering knuckle support and the frame and the pivots 9 and 10 between the lower wishbone and the steering knuckle support and the frame are all parallel to each other, as in the ordinary suspension. The steering knuckle support 3 carries the king pin 11 (shown in dotted lines), on which is mounted the steering knuckle 12, which, in turn, carries the wheel 13, the brake drum 14, and the brake backing plate 15. The brake backing plate 15 is not fixed to the steering knuckle but is mounted as in the well-known Dubonnet suspension (U. S. Patent No. 2,136,586) so that it can turn about the same axis as the wheel.

In order to keep the brake backing plate 15 from spinning around on the steering knuckle, it is connected by a brake reaction sloping link 16 to an extension of the upper wishbone 5, which thus forms a lever. The upper end of the brake reaction link 16 is connected to the upper wishbone extension by a ball and socket joint 17 and to the brake backing plate 15 by another such joint 18. The first of these two joints lies exactly on the axis of the king pin 11 so that the force transmitted by the link 16 will have no effect on the steering of the car, and the neck of the ball of the joint extends down along this axis so that it will merely turn and not swing around in the joint as the wheel 13 is steered.

The joint 18 at the front end of the link 16 is lower than the other joint 17 so that, as the wheel 13 rises and falls with respect to the frame 4 and the joint 17 at the extended end of the upper wishbone 5 rises and falls with respect to the wheel, the brake backing plate 15 will turn backward and forward. The parts are so proportioned that the turning of the brake backing plate 15 is the right amount to satisfy the conditions for the elimination of nose diving.

The correct proportions are such that, when the brake is locked and the wheel is raised and lowered, a spot on the bottom of the locked wheel will move in a path that slopes up and forward at an angle to the vertical whose tangent is equal to the height of the center of gravity of the car divided by the product of the wheelbase and the fraction of the total braking effort that is applied to the front wheels. This is the movement which the linkage must be proportioned to give in order to eliminate nose-diving exactly, but any proportions close to these will give fairly good results.

The invention has been shown as applied to only one kind of suspension, but it is to be understood that the invention may be applied to practically any kind of spring suspension in which the steering knuckle support is connected to the frame by a link.

I claim as my invention any structure falling within the terms of the following definitions:

1. In a vehicle, a frame, a lever pivoted to the frame, a steering knuckle support pivoted to the lever, a steering knuckle pivoted on the support, a wheel carried by the steering knuckle, braking mechanism including a brake drum connected to the wheel and a brake anchor plate rotatably mounted on the steering knuckle, and a link connecting the brake anchor plate to the lever.

2. In a vehicle, a frame, a lever pivoted at one end to the frame, a steering knuckle support pivoted to the lever a short distance from its other end, a steering knuckle pivoted on the support, the axis of the steering knuckle pivot extending through the second end of the lever, braking mechanism including a brake drum connected to the wheel and a brake anchor plate rotatably mounted on the steering knuckle, and a link connecting the brake anchor plate to the second end of the lever.

3. In a vehicle, a frame, a lever pivoted at one end to the frame, a steering knuckle support pivoted to the lever a short distance from its other end, a steering knuckle pivoted on the support, the axis of the steering knuckle pivot extending through the second end of the lever, braking mechanism including a brake drum connected to the wheel and a brake anchor plate rotatably mounted on the steering knuckle, and a link connecting the brake anchor plate to the second end of the lever, the link extending down and away from the center of the vehicle.

4. In a vehicle, a frame, a steering knuckle, a wheel carried by the steering knuckle, a linkage connecting the steering knuckle to the frame for guiding it in an up-and-down movement relative to the frame and for guiding it in a swinging movement about an upright steering axis, a brake drum connected to the wheel, a brake anchor plate rotatably mounted on the steering knuckle, and a linkage for rotating the brake anchor plate back and forth relative to the steering knuckle as the steering knuckle rises and falls relative to the frame, the latter linkage including a part connected to the brake anchor plate, a part connected to the frame, and a swivel joint connecting those two parts together, the swivel joint being located approximately on the steering axis.

5. In a vehicle, a frame, a steering knuckle, a wheel carried by the steering knuckle, a linkage connecting the steering knuckle to the frame for guiding it in an up-and-down movement relative to the frame and for guiding it in a swinging movement about an upright steering axis, a brake drum connected to the wheel, a brake anchor plate rotatably mounted on the steering knuckle, and a linkage formed of rigid members for positively rotating the brake anchor plate back and forth relative to the steering knuckle as the steering knuckle rises and falls relative to the frame and for preventing any other rotation of the brake anchor plate in either direction.

PAUL HEFTLER.

REFERENCES CITED

The following references are of record in the file of this patent:

UNITED STATES PATENTS

| Number | Name | Date |
|---|---|---|
| 2,078,210 | Sanford | Apr. 20, 1937 |
| 2,153,083 | Griswold | Apr. 4, 1939 |
| 2,431,426 | Sauer | Nov. 25, 1947 |